United States Patent
Patino et al.

(10) Patent No.: US 11,399,452 B2
(45) Date of Patent: Aug. 2, 2022

(54) MOUNTING BRACKET FOR A FRONT THREE-POINT HITCH

(71) Applicant: DEERE & COMPANY, Moline, IL (US)

(72) Inventors: Mario Patino, Ludwigshafen (DE); Martin Heitlinger, Oestringen (DE)

(73) Assignee: DEERE & COMPANY, Moline, IL (US)

( * ) Notice: Subject to any disclaimer, the term of this patent is extended or adjusted under 35 U.S.C. 154(b) by 524 days.

(21) Appl. No.: 16/433,618

(22) Filed: Jun. 6, 2019

(65) Prior Publication Data

US 2019/0373795 A1   Dec. 12, 2019

(30) Foreign Application Priority Data

Jun. 12, 2018  (DE) .......................... 102018209347.4

(51) Int. Cl.
*A01B 59/06* (2006.01)

(52) U.S. Cl.
CPC .................................. *A01B 59/066* (2013.01)

(58) Field of Classification Search
CPC ... A01B 59/048; A01B 59/064; A01B 59/066; A01B 59/062
See application file for complete search history.

(56) References Cited

U.S. PATENT DOCUMENTS

| | | | | |
|---|---|---|---|---|
| 3,195,653 A * | 7/1965 | Carlsson | ............. | A01B 59/062 172/449 |
| 3,231,294 A * | 1/1966 | Horney | ................ | A01B 59/062 172/272 |
| 3,592,273 A * | 7/1971 | Martin | ................... | A01B 31/00 172/373 |
| 4,379,673 A * | 4/1983 | Takahashi | ............ | A01B 59/048 172/273 |
| 4,832,358 A * | 5/1989 | Bull | ..................... | B62D 53/061 280/418.1 |
| 5,267,747 A * | 12/1993 | Thorn | .................. | A01B 59/043 172/450 |

(Continued)

FOREIGN PATENT DOCUMENTS

| | | |
|---|---|---|
| DE | 3823491 C1 | 5/1989 |
| GB | 2182834 A | 5/1987 |

(Continued)

OTHER PUBLICATIONS

European Search Report issued in counterpart European Patent Application No. 19179044.3 dated Nov. 13, 2019 (12 pages).

*Primary Examiner* — Jamie L McGowan

(57) ABSTRACT

A mounting bracket for mounting a front three-point hitch on a tractor includes a linking part for articulated mounting of the front three-point hitch, a connecting part for coupling the linking part to a support structure of the tractor, and a first contact region defined on the linking part and a second contact region defined on the connecting part. The first contact region interacts with the second contact region for coupling the linking part to the connecting part. The first contact region and the second contact region are separably clamped to one another in a coupling position. The linking part is selectively disposable in one of a plurality of coupling positions relative to the connecting part.

20 Claims, 3 Drawing Sheets

(56) References Cited

U.S. PATENT DOCUMENTS

| | | | | |
|---|---|---|---|---|
| 5,423,394 A * | 6/1995 | Kendle | ............... | A01B 59/048 |
| | | | | 172/439 |
| 5,538,088 A * | 7/1996 | Wait | ............... | A01B 59/06 |
| | | | | 172/439 |
| 5,697,454 A * | 12/1997 | Wilcox | ............... | A01B 59/068 |
| | | | | 172/439 |
| 5,709,274 A * | 1/1998 | Herbold | ............... | B60D 1/07 |
| | | | | 172/248 |
| 6,099,012 A * | 8/2000 | Mortimer | ............... | B60D 1/075 |
| | | | | 280/292 |
| 6,244,813 B1 * | 6/2001 | Cataldo | ............... | B60P 3/125 |
| | | | | 224/521 |
| 6,321,851 B1 * | 11/2001 | Weiss | ............... | A01B 59/062 |
| | | | | 172/444 |
| 6,431,288 B1 * | 8/2002 | Hoffart | ............... | A01B 59/048 |
| | | | | 172/439 |
| 6,474,673 B1 * | 11/2002 | Biggins | ............... | B60D 1/07 |
| | | | | 280/417.1 |
| 6,742,600 B2 * | 6/2004 | Hoelscher | ............... | A01B 59/042 |
| | | | | 172/679 |
| 7,549,666 B1 * | 6/2009 | Sahlem | ............... | B62D 53/061 |
| | | | | 280/438.1 |
| 8,496,070 B2 * | 7/2013 | Kollath | ............... | A01B 73/00 |
| | | | | 172/448 |
| 8,555,995 B2 * | 10/2013 | Harris | ............... | A01B 59/064 |
| | | | | 172/810 |
| 2005/0229445 A1 * | 10/2005 | Poquette | ............... | E02F 3/3609 |
| | | | | 37/468 |
| 2006/0018746 A1 * | 1/2006 | Gustafson | ............... | A01B 59/068 |
| | | | | 414/723 |
| 2006/0081382 A1 * | 4/2006 | Tuttle | ............... | A01B 59/062 |
| | | | | 172/439 |
| 2007/0098538 A1 * | 5/2007 | Zettel | ............... | E02F 3/3604 |
| | | | | 414/723 |
| 2008/0035356 A1 * | 2/2008 | Dahl | ............... | B62D 49/065 |
| | | | | 172/439 |
| 2011/0277357 A1 * | 11/2011 | Schmeichel | ............... | E01H 5/062 |
| | | | | 37/231 |
| 2012/0085559 A1 * | 4/2012 | Schwalenberg | ............... | A01B 59/066 |
| | | | | 172/439 |
| 2012/0138321 A1 * | 6/2012 | Harris | ............... | A01B 59/064 |
| | | | | 172/810 |
| 2012/0285050 A1 * | 11/2012 | Osgood | ............... | E01H 5/067 |
| | | | | 37/231 |
| 2014/0123523 A1 * | 5/2014 | Seeley | ............... | E01H 5/06 |
| | | | | 37/231 |
| 2014/0356115 A1 * | 12/2014 | Krause | ............... | B60P 1/4414 |
| | | | | 414/495 |
| 2015/0308060 A1 * | 10/2015 | Beaird, III | ............... | E01H 5/065 |
| | | | | 37/231 |
| 2017/0290258 A1 * | 10/2017 | Mollick | ............... | A01B 59/002 |
| 2018/0359902 A1 * | 12/2018 | McAdam | ............... | A01B 59/064 |
| 2019/0293506 A1 * | 9/2019 | Brutt | ............... | B60D 1/248 |
| 2020/0375082 A1 * | 12/2020 | Unruh | ............... | A01B 69/007 |

FOREIGN PATENT DOCUMENTS

| | | |
|---|---|---|
| GB | 2512660 A | 10/2014 |
| KR | 101354769 B1 | 1/2014 |

\* cited by examiner

MOUNTING BRACKET FOR A FRONT THREE-POINT HITCH

RELATED APPLICATIONS

This application claims priority to German Patent Application Ser. No. 102018209347.4, filed Jun. 12, 2018, the disclosure of which is hereby incorporated by reference in its entirety.

FIELD OF THE DISCLOSURE

The present disclosure relates to a mounting bracket for mounting a front three-point hitch on a tractor.

BACKGROUND

A mounting bracket has a linking part to which a front three-point hitch is articulatedly mounted. The linking part contributes to the front three-point hitch being able to make the desired pattern of motions relative to a support structure of the tractor.

There is a need, however, for improving the functionality of a mounting bracket for a front three-point hitch.

SUMMARY

In the present disclosure, a mounting bracket has a linking part for articulated mounting of the front three-point hitch and a connecting part for connecting the linking part to a support structure of the tractor. The linking part contains a contact region, while the connecting part contains an opposite mating contact region. The contact region and the mating contact region work together to achieve a mechanical coupling of the linking part to the connecting part. Here, the contact region and the mating contact region are tightened together by means of clamping agents (for example, clamping screws) so as to be separable. Thus, there is a separable connection between the linking part and the connecting part. The coupling is thus configured so that during coupling, the coupled linking part is in one of a plurality of different possible coupling positions with respect to the connecting part.

The different coupling positions make it possible for the mounting bracket to be adjusted to different boundary conditions (for example, different tractor tire sizes). Consequently, in spite of different boundary conditions, the front three-point hitch, or lower link arm mounted on the bracket, can maintain approximately the same desired relative position with respect to the ground or the front axle of the tractor. In this way, the same front three-point hitch can be used on different tractors without special technical modifications and adaptations, which significantly supports its functionality with regard to different applications.

The clamping mechanism can be variously designed, for example, as clamping screws or bolts. The number of individual clamping mechanisms on a contact region can be set to vary in dependence on the forces that are to be transmitted between the articulating part and the connecting part.

The linking part extends along a vertical direction (i.e., a vertical axis of the tractor), while the connecting part extends along a lengthwise direction (i.e., a lengthwise axis of the tractor) that is perpendicular to the vertical direction. Therefore, a plurality of different coupling positions can be realized in a structurally simple way with the help of the contact region and the mating contact region in that the linking part can be shifted into different positions, for example, along the vertical direction or the lengthwise direction.

Different coupling positions can be implemented cheaply and geometrically precisely by providing at least one spacer between the contact region and the mating contact region. Then, the linking part can be moved into different coupling positions in dependence on the number and dimensioning or geometric design of the envisioned spacers.

In another embodiment, the contact region has a contact surface or consists of a contact surface that interacts with a mating contact surface of the mating contact region, where the clamping direction of the clamping mechanism is effective across (in particular approximately perpendicular to) the contact surface and the mating contact surface. Such a structure supports mechanically stable coupling positions of the linking part. Here, the mating contact region comprises the mating contact surface or consists of the mating contact surface.

The contact surface and the mating contact surface are disposed parallel to each other so that easy management of the linking part and the connecting part is supported during mounting. In particular, the contact area and the mating contact area are each made flat, which keeps the manufacturing of the contact region and the mating contact region technically simple.

In order to keep production costs for the mounting bracket low while realizing the different coupling positions, the contact surface or the mating contact surface is disposed at a coupling angle greater than 0° and less than 90° with respect to a reference line, in particular the vertical direction of the mounting bracket.

In other embodiments, the coupling angle is 30° to 60°, in particular 45°, with respect to the reference line. This supports the realization of the desired different coupling positions with a space-saving mounting bracket structure. Moreover, the geometry makes possible an efficient transfer of force between the support structure of the tractor and the front three-point hitch.

As already noted, the connecting part of the mounting bracket is coupled to the linking part so as to be separable. The connecting part can be made in one piece or as a plurality of parts. It can be attached separably or inseparably to the support structure of the tractor, whereby the entire mounting bracket is also attached to the support structure. If the attachment to the support structure is inseparable, the connecting part can be a monolithic component of the support structure as manufactured. Alternatively, the connecting part can be joined to the support structure later, for example, by welding.

In a further embodiment, the linking part has a plurality of contact regions along the vertical direction. This has a good effect, in particular for specific structural embodiments of the mounting bracket, on a stable transfer of force between the connecting part and the linking part. Correspondingly, the connecting part can be made with a plurality of mating contact regions or have a plurality of connecting components, each with one mating contact region.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
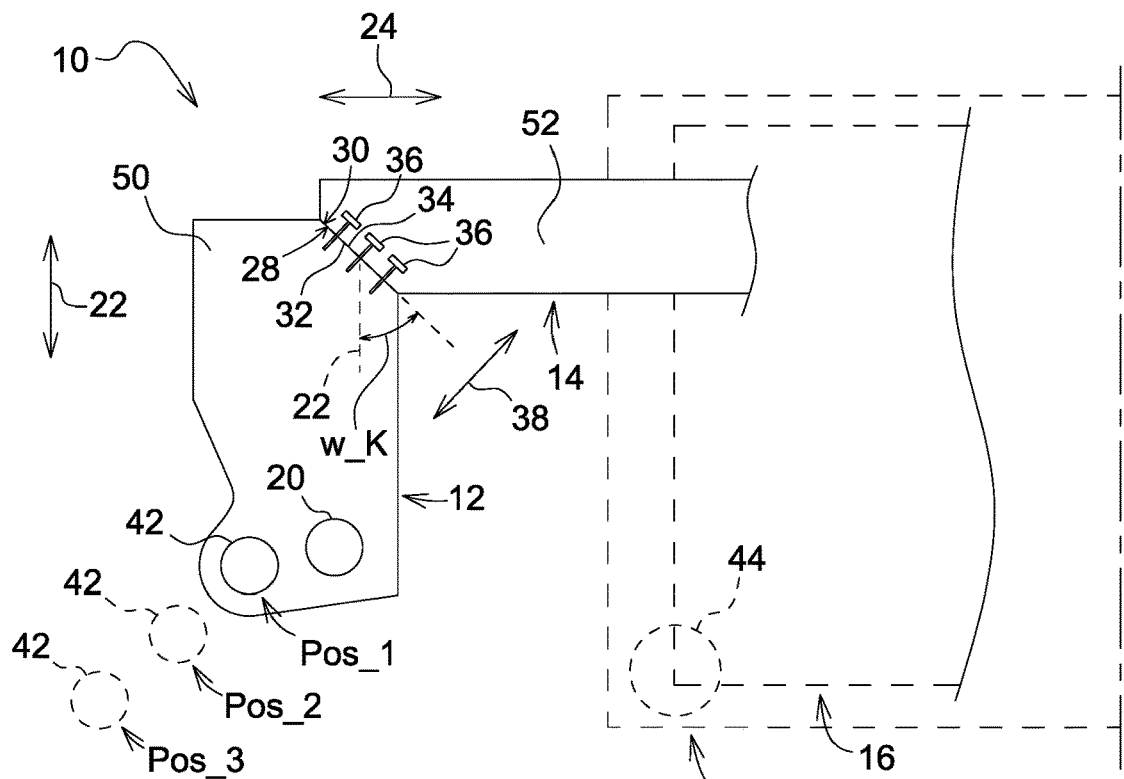
FIG. 1 shows a schematic side view of a mounting bracket connected to a tractor.

FIG. 1 schematically shows a mounting bracket 10 with a linking part 12 and a connecting part 14. The mounting bracket 10 is attached to a schematically represented support structure 16 (for example, the chassis) of a tractor 18 and serves for articulated mounting of a front three-point hitch having two lower link arms and one upper link arm, which is not shown here. Two lower link arms of the front three-point hitch are connected with parallel spacing on a hitch pin 20 of the linking part 12 so as to be able to carry out pivoting motions of the front three-point hitch, for instance along a vertical direction 22. The pivot axis of the hitch pin 20 runs perpendicular to the plane of the drawing in FIG. 1.

Figure 2:
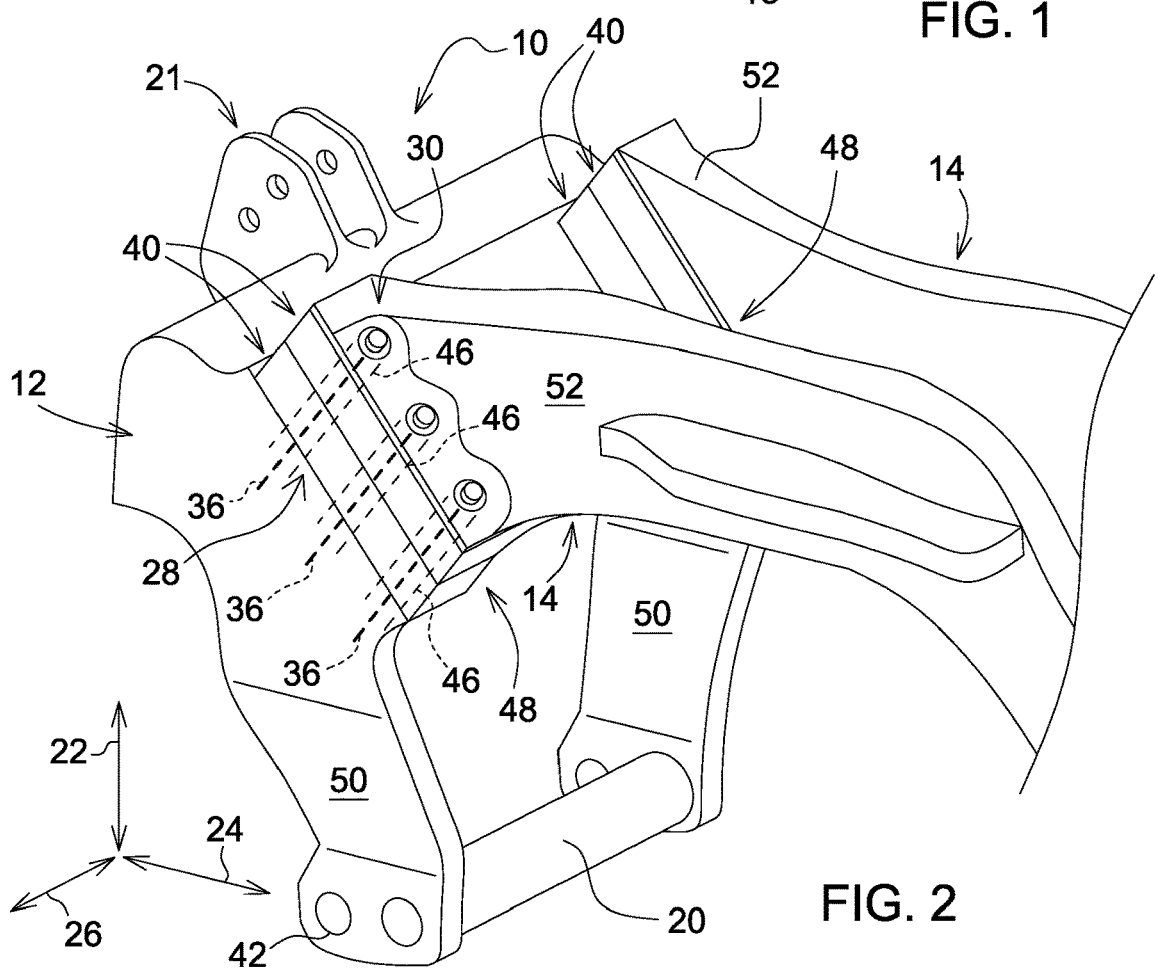
FIG. 2 shows a perspective view of an embodiment of a mounting bracket as in FIG. 1 with a coupling position of its linking part that has been changed with respect to FIG. 1.

The upper link arm of the front three-point hitch, which was already mentioned and is not shown here, is connected to a top bracket 21 of the linking part 12 (FIG. 2).

While the linking part 12 extends along the vertical direction 22, the connecting part 14 is at least in sections directed along a lengthwise direction 24. The vertical direction 22 and the lengthwise direction 24 are disposed at right angles to each other and each runs perpendicular to a transverse direction 26, along which the pivot axis of the hitch pin 20 extends.

According to FIG. 1, the linking part 12 has a contact region 28, which interacts with a mating contact region 30 of the connecting part 14 so as to achieve a mechanical coupling between the linking part 12 and the connecting part 14. The contact region 28 has a contact surface 32, which interacts with a mating contact surface 34 of the mating contact region 30 for coupling. During coupling, the contact surface 32 and the mating contact surface 34 remain fixed to each other by a clamping mechanism 36 in the form of a plurality of clamping screws. Here, a clamping force direction 38 of the clamping mechanism 36 runs across the contact surface 32 and the mating contact surface 34. The term "across" can mean various angles of the clamping force direction 38 with respect to the contact surface 32 or the mating contact surface 34 that are greater than 0° and less than 180°. In the embodiment shown in FIG. 1, the clamping force direction 38 is directed at an angle of 90° relative to the contact surface 32 and the mating contact surface 34.

The design and number of the individual clamping mechanism 36 can vary. While two sets of three, thus a total of six, clamping screws are envisioned in the embodiment in FIGS. 1 and 2, a different number may also be suitable in each case according to the required transfer of force between the linking part 12 and the connecting part 14.

One can also see in FIG. 2 that a coupling region 48 (that is, an interacting pair consisting of a contact region 28 and a mating contact region 30 with optionally at least one spacer 40) is supplemented along the transverse direction 26 by a second such coupling region 48. Through this, the two like side plates 50 of the linking part 12 are each coupled with one of the two, also like, connecting struts 52 of the connecting part 14. However, the second coupling region 48 is not visible in FIG. 1.

The cross section of the contact surface 32 or the mating contact surface 34 can be variously designed. If the surfaces do not comprise a flat plane, they are designed as opposing negative reliefs in order to form a form-fit contact against each other. In FIG. 1, the contact surface 32 and the mating contact surface 34 are each made as a flat plane and, during coupling, lie parallel to each other. Here, the contact surface 32 and the mating contact surface 34 enclose a coupling angle w_K of about 45° with the vertical direction 22 as the reference line. Other coupling angles w_K lie in the range of 30° to 60° with respect to the vertical direction 22.

On the basis of the described mechanical coupling, different coupling positions of the linking part 12 with respect to the vertical direction 22 and the lengthwise direction 24 can be achieved using at least one spacer 40 (FIG. 2). Consequently, the coupling positions of the linking part 12 are also differently disposed relative to the connecting part 14. In the case of the embodiment shown in FIG. 2, two spacers 40 are used so that a total of three different coupling positions Pos_1, Pos_2 and Pos_3 can be realized. In FIG. 1, the different coupling positions Pos_2 and Pos_3 are indicated by an offset dashed-line representation of a side plate hole 42 of the linking part 12.

The mechanical coupling with a different number of spacers 40 can be advantageously used, for example, in the case of different sizes of the tractor tires on a front axle 44 of the tractor 18. The front axle 44 is disposed parallel to the transverse direction 26. If one specific tire size is replaced with a different tire size, the use of an appropriately dimensioned spacer 40 or an appropriate number of spacers 40 will result in the front three-point hitch always maintaining an optimum distance to the ground or to the front axle 44.

Three different tire sizes are envisioned in the illustrated embodiment. No spacer 40 is used in the case of the smallest tire size (coupling position Pos_1). One spacer 40 is disposed between the contact surface 32 and the mating contact surface 34 for the middle tire size (coupling position Pos_2). As shown in FIG. 2, two spacers 40 are disposed between the contact surface 32 and the mating contact surface 34 in the case of the largest tire size (coupling position Pos_3).

The thickness of the spacer 40 in the direction of tightening 38 is, for example, 69 mm. The extension of the linking part 12 from its first coupling position Pos_1 to its third coupling position Pos_3 is, for example, 100 mm along the vertical direction 22 and, for example, 95 mm along the lengthwise direction 24. The spacers 40 have through-holes 46 as to be able to tighten or screw the clamping mechanism 36 through from the mating contact region 30 to the linking part 12.

Figure 3:
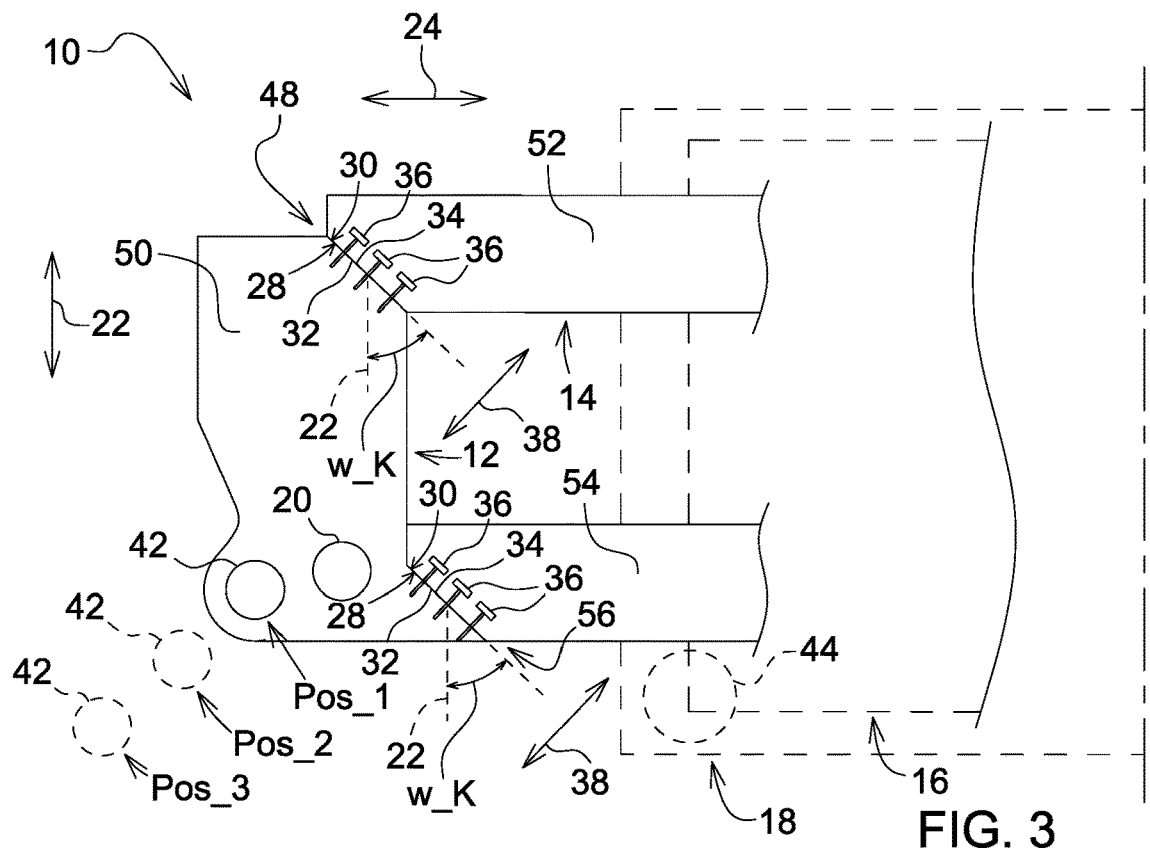
FIG. 3 shows a schematic side view of another embodiment of the mounting bracket.

FIG. 3 shows another embodiment of the mounting bracket 10. The connecting part 14 contains an additional connecting strut 54 along the vertical direction 22, the strut having a mating contact region 30 with a mating contact surface 34. The latter belongs to an additional coupling region 56, which is disposed offset in the vertical direction 22 with respect to the coupling region 48. Correspondingly, the linking part 12 has two contact regions 28 offset along the vertical direction 22. The coupling angles w_K of both coupling regions 48, 56 are the same.

Figure 4:
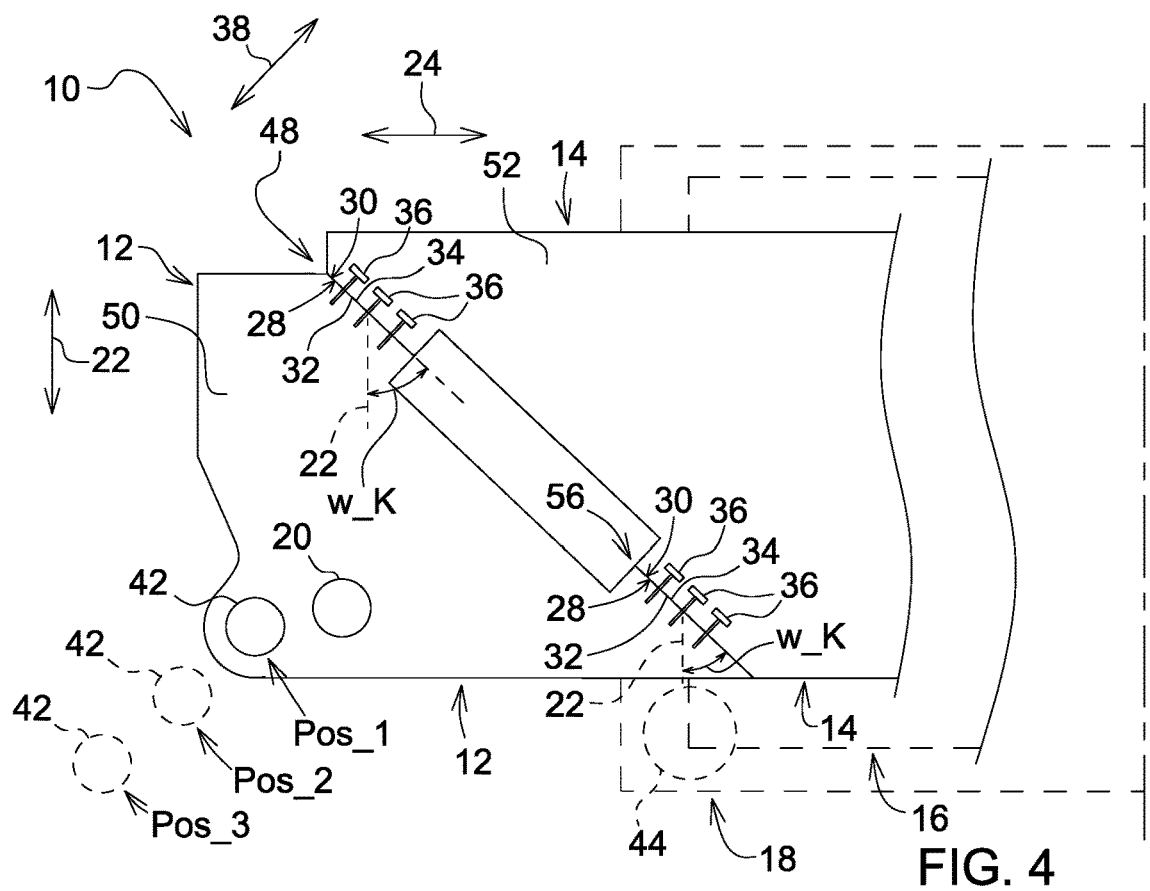
FIG. 4 shows a schematic side view of another embodiment of the mounting bracket.

In FIG. 4, the connecting part 14 has a single connecting strut 52 along the vertical direction 22. In contrast to the embodiment in FIG. 1, the connecting strut 52, however, has two mating contact regions 30 with two mating contact surfaces 34, which are spaced apart along the vertical direction 22 and which are components of two coupling regions 48, 56. Correspondingly, the side plates 50 of the linking part 12 contain two contact regions 28 with two contact surfaces 32, which are spaced apart along the vertical direction 22. The coupling angles w_K of both coupling regions 48, 56 are again identically dimensioned.

Figure 5:
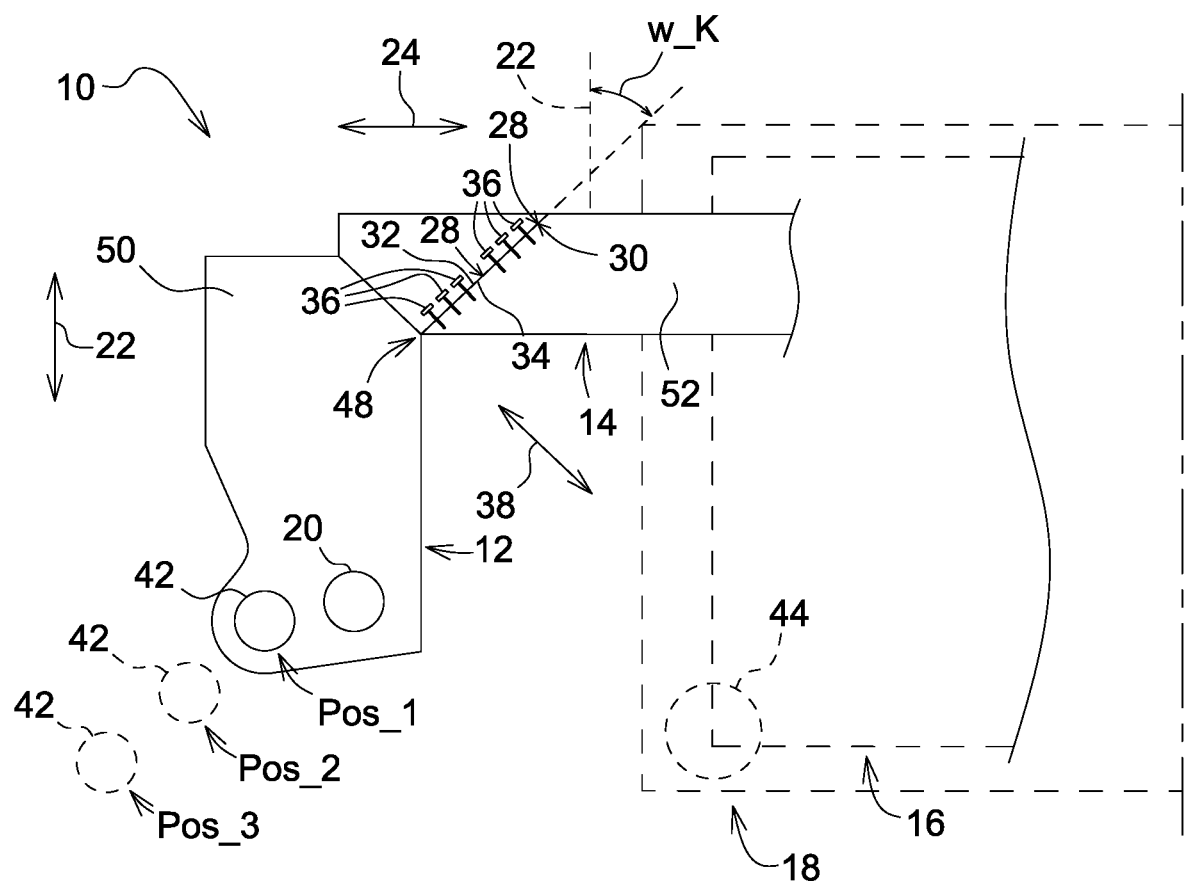
FIG. 5 shows a schematic side view of another embodiment of the mounting bracket.

In contrast to the variation in FIG. 1, in the embodiment in FIG. 5, the contact surface 32 and the mating contact surface 34 are offset by about 90° with respect to the vertex of the coupling angle w_K. The contribution of the coupling angle w_K indicated in FIG. 5 is therefore identical to the contribution of the coupling angle w_K shown in FIG. 1. The geometric configuration of the coupling region 48 in FIG. 5 enables the same different coupling positions Pos_1, Pos_2, Pos_3 without using spacers 40. Rather, it is sufficient for each coupling position Pos_1, Pos_2, Pos_3 to have an appropriate number of clamping means 36, which then are used in dependence on the coupling position Pos_1, Pos_2 or Pos_3 that is desired in each case. The relevant coupling position Pos_1, Pos_2 or Pos_3 in this case results from the parallel offset of the contact surface 32 with respect to the mating contact surface 34 that is selected in each case.

Here, the number of clamping screws 36 shown in FIG. 5 (six) is only an example. A different number of clamping means 36 may also be suitable for realization of the three different coupling positions Pos_1, Pos_2 or Pos_3.

It should be further noted that individual details shown in the drawings are, on the one hand, schematic representations and, on the other hand, are not necessarily true to scale.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A mounting bracket for mounting a front three-point hitch on a tractor, comprising:
a linking part for articulated mounting of the front three-point hitch;
a connecting part for coupling the linking part to a support structure of the tractor;
a first contact region defined on the linking part and a second contact region defined on the connecting part, the first contact region contacting the second contact region for coupling the linking part to the connecting part in a first coupling position; and
a first spacer separably disposed between the first contact region and the second contact region such that the first contact region and the second contact region are spaced apart a first distance in a second coupling position;
wherein the linking part is selectively disposable in one of the first and second coupling positions relative to the connecting part;
wherein the first contact region is disposed lower with respect to a vertical direction in the second coupling position than the first coupling position.

2. The mounting bracket of claim 1, further comprising a clamping mechanism for clamping the first contact region and the second contact region relative to one another in the first and second coupling positions.

3. The mounting bracket of claim 1, wherein the linking part extends along the vertical direction and the connecting part extends along a longitudinal direction that runs perpendicular to the vertical direction.

4. The mounting bracket of claim 3, wherein the first and second coupling positions of the linking part is different along the vertical direction or along the longitudinal direction.

5. The mounting bracket of claim 1, further comprising:
a second spacer separably disposed between the first contact region and the second contact region such that the first contact region and the second contact region are spaced apart a second distance in a third coupling position;
wherein the first contact region is disposed lower with respect to the vertical direction in the third coupling position than the second coupling position.

6. The mounting bracket of claim 1, wherein the first contact region comprises a first contact surface for interactively mating with a second contact surface of the second contact region.

7. The mounting bracket of claim 6, wherein a direction of the clamping force extends across the first contact surface and the second contact surface.

8. The mounting bracket of claim 6, wherein the first contact surface and the second contact surface are disposed parallel to one another.

9. The mounting bracket of claim 6, wherein the first contact surface or the second contact surface is disposed at a coupling angle greater than 0° and less than 90° with respect to a vertical reference line.

10. The mounting bracket of claim 9, wherein the coupling angle is between approximately 30° to 60° with respect to the vertical reference line.

11. The mounting bracket of claim 9, wherein the coupling angle is approximately 45° with respect to the vertical reference line.

12. The mounting bracket of claim 1, wherein the linking part comprises a plurality of contact regions along the vertical direction.

13. A tractor, comprising:
a chassis;
a front axle;
a front three-point hitch;
a mounting bracket for mounting the hitch on the tractor, the mounting bracket comprising a linking part for articulated mounting of the front three-point hitch, a connecting part for coupling the linking part to a support structure of the tractor, and a first contact region defined on the linking part and a second contact region defined on the connecting part, where the first contact region contacts the second contact region for coupling the linking part to the connecting part in a first coupling position when a first tire is connected to the front axle; and
a first spacer separably disposed between the first contact region and the second contact region such that the connecting part and the linking part are spaced apart a first distance in a second coupling position when a second tire is connected to the front axle, the second tire being a different size than the first tire;

wherein the linking part is selectively disposable in one of the first and second coupling positions relative to the connecting part;

wherein the linking part is disposed an approximately same distance relative to the ground in the second coupling position with the second tire connected to the front axle than the first coupling position with the first tire connected to the front axle.

14. The tractor of claim 13, further comprising a clamping mechanism for clamping the first contact region and the second contact region relative to one another in the first and second coupling positions.

15. The tractor of claim 13, wherein the linking part extends along a vertical direction and the connecting part extends along a longitudinal direction that runs perpendicular to the vertical direction.

16. The tractor of claim 15, wherein the first and second coupling positions of the linking part is different along the vertical direction or the longitudinal direction.

17. The tractor of claim 13, further comprising:

a second spacer separably disposed between the first contact region and the second contact region such that the first contact region and the second contact region are spaced apart a second distance in a third coupling position when a third tire is connected to the front axle, the third tire being a different size than the first tire and the second tire;

wherein the linking part is disposed the approximately same distance relative to the ground in the third coupling position with the third tire connected to the front axle than the second coupling position with the second tire connected to the front axle.

18. The tractor of claim 13, wherein the first contact region comprises a first contact surface for interactively mating with a second contact surface of the second contact region.

19. The tractor of claim 18, wherein the first contact surface and the second contact surface are disposed parallel to one another.

20. A mounting bracket for mounting a front three-point hitch on a tractor, comprising:

a linking part for articulated mounting of the front three-point hitch;

a connecting part for coupling the linking part to a support structure of the tractor;

a first contact region defined on the linking part and a second contact region defined on the connecting part; and a clamping mechanism for clamping the first contact region and the second contact region in contact to one another in a first coupling position and a second coupling position;

wherein the linking part is selectively disposable in one of the first and second coupling positions relative to the connecting part;

wherein the first contact region and the second contact region are disposed parallel to one another along a coupling line between approximately 30° to 60° with respect to a vertical reference line;

wherein the first coupling position and the second coupling position are disposed on the coupling line;

wherein the second coupling position is offset from the first coupling position along the coupling line;

wherein the first contact region is disposed lower with respect to a vertical direction in the second coupling position than in the first coupling position.

* * * * *